US009779172B2

(12) United States Patent
Chang et al.

(10) Patent No.: US 9,779,172 B2
(45) Date of Patent: *Oct. 3, 2017

(54) PERSONALIZED SEARCH RESULT SUMMARY (71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/499,563

(22) Filed: Sep. 29, 2014

(65) Prior Publication Data
US 2015/0052118 A1 Feb. 19, 2015

Related U.S. Application Data (63) Continuation of application No. 13/833,797, filed on Mar. 15, 2013.

(51) Int. Cl.
*G06F 7/00* (2006.01)
*G06F 17/30* (2006.01)

(52) U.S. Cl.
CPC .. *G06F 17/30867* (2013.01); *G06F 17/30864* (2013.01); *G06F 17/30991* (2013.01)

(58) Field of Classification Search
CPC ......... G06F 17/30864; G06F 17/30867; G06F 17/30991
USPC ....................................................... 707/722
See application file for complete search history.

(56) References Cited

U.S. PATENT DOCUMENTS

| 7,899,803 | B2 | 3/2011 | Cotter et al. |
| 8,006,197 | B1 | 8/2011 | Nevill-Manning et al. |
| 8,498,984 | B1* | 7/2013 | Hwang et al. ................ 707/731 |
| 2007/0078822 | A1* | 4/2007 | Cucerzan .......... G06F 17/30864 |
| 2007/0239716 | A1* | 10/2007 | Weininger ........ G06F 17/30699 |
| 2008/0133505 | A1* | 6/2008 | Bayley .............. G06F 17/30864 |
| 2008/0168042 | A1 | 7/2008 | Dettinger et al. |
| 2009/0077056 | A1* | 3/2009 | Ravikumar et al. ............. 707/5 |
| 2009/0192988 | A1* | 7/2009 | Ravikumar ............ G06Q 30/06 |
| 2009/0282013 | A1* | 11/2009 | Joshi et al. ....................... 707/5 |
| 2009/0327240 | A1* | 12/2009 | Meehan ........... G06F 17/30554 |
| 2010/0114874 | A1* | 5/2010 | Hansson et al. .............. 707/722 |
| 2010/0114876 | A1 | 5/2010 | Mandel et al. |

(Continued)

OTHER PUBLICATIONS

US Patent Application, dated Mar. 15, 2013, for U.S. Appl. No. 13/833,797, filed Mar. 15, 2013, entitled "Personalized Result Summary", invented by B.W. Chang et al., Total 26 pages.

(Continued)

*Primary Examiner* — Kris Mackes
*Assistant Examiner* — Lin Lin Htay
(74) *Attorney, Agent, or Firm* — Janaki K. Davda; Konrad, Raynes, Davda and Victor LLP (57) ABSTRACT Provided are techniques for displaying a personalized search result summary for a search result. A search result from executing a search query is received. A category of search for the search query is determined. A summary template is selected from a collection of summary templates based on the category of search. A personalized summary is generated using the selected summary template and the received search result.

5 Claims, 7 Drawing Sheets

(56) References Cited

U.S. PATENT DOCUMENTS

| | | | | |
|---|---|---|---|---|
| 2010/0115396 | A1* | 5/2010 | Byron | G06F 17/30873 715/234 |
| 2011/0225115 | A1* | 9/2011 | Moitra | G06F 17/30864 706/50 |
| 2011/0231392 | A1 | 9/2011 | Boswell | |
| 2011/0302028 | A1* | 12/2011 | Swenson | 705/14.49 |
| 2012/0102024 | A1* | 4/2012 | Campbell et al. | 707/722 |
| 2012/0102386 | A1* | 4/2012 | Campbell et al. | 715/229 |
| 2013/0031470 | A1* | 1/2013 | Daly et al. | 715/243 |

OTHER PUBLICATIONS

Preliminary Amendment, dated Sep. 29, 2014, for U.S. Appl. No. 13/833,797, filed Mar. 15, 2013, invented by B.W. Chang et al., Total 5 pages.

Office Action, dated Oct. 24, 2014, for U.S. Appl. No. 13/833,797, filed Mar. 15, 2013, invented by Billy W. Chang et al., Total 26 pages.

Response to Office Action, dated Jan. 22, 2015, for U.S. Appl. No. 13/833,797, filed Mar. 15, 2013, invented by Billy W. Chang et al., Total 12 pages.

Final Office Action, dated May 6, 2015, for U.S. Appl. No. 13/833,797, filed Mar. 15, 2013, invented by Billy W. Chang et al., Total 24 pages.

Response to Final Office Action, dated Aug. 6, 2015, for U.S. Appl. No. 13/833,797, filed Mar. 15, 2013, invented by Billy W. Chang et al., Total 11 pages.

Office Action, dated Nov. 27, 2015, for U.S. Appl. No. 13/833,797, filed Mar. 15, 2013, invented by Billy W. Chang et al., Total 29 pages.

Response to Office Action, dated Feb. 29, 2016, for U.S. Appl. No. 13/833,797, filed Mar. 15, 2013, invented by Billy W. Chang et al., Total 11 pages.

Final Office Action, dated Jun. 15, 2016, for U.S. Appl. No. 13/833,797, filed Mar. 15, 2013, invented by Billy W. Chang et al., Total 30 pages.

Response to Final Office Action, dated Sep. 15, 2016, for U.S. Appl. No. 13/833,797, filed Mar. 15, 2013, invented by Billy W. Chang et al., Total 12 pages.

Office Action, dated Dec. 23, 2016, for U.S. Appl. No. 13/833,797, filed Mar. 15, 2013, invented by Billy W. Chang et al., Total 33 pages.

Response to Office Action, dated Mar. 15, 2017, for U.S. Appl. No. 13/833,797, filed Mar. 15, 2013, invented by Billy W. Chang et al., Total 12 pages.

Notice of Allowance, dated May 30, 2017 for U.S. Appl. No. 13/833,797 (54.102), filed Mar. 15, 2013, invented by Billy W. Chang et al., Total 17 pages.

* cited by examiner

PERSONALIZED SEARCH RESULT SUMMARY

FIELD

Embodiments of the invention relate to displaying a personalized search result summary for a search result.

BACKGROUND

A search engine typically receives input of a search query including one or more keywords. Then, the search engine locates search results (e.g., documents) containing the one or more keywords and provides a list of the search results, with a summary for each of the search results.

For example, the following is an example list of documents with summaries for the documents:
Document 1
  Summary 1
Document 2
  Summary 2

Typically, in a search engine, the summary of the search results is displayed based on how that summary is configured by a search provider (e.g., the company or entity providing the search engine).

SUMMARY

Provided is a computer implemented method for displaying a personalized search result summary for a search result. A search result from executing a search query is received with a processor of a computer. A category of search for the search query is determined with the processor of the computer. A summary template is selected, with the processor of the computer, from a collection of summary templates based on the category of search. A personalized summary is generated, with the processor of the computer, using the selected summary template and the received search result.

Provided is a computer program product for displaying a personalized search result summary for a search result. The computer program product comprises a computer readable storage medium having program code embodied therewith, the program code executable by at least one processor to: receive a search result from executing a search query, determine a category of search for the search query, select a summary template from a collection of summary templates based on the category of search, and generate a personalized summary using the selected summary template and the received search result.

Provided is a computer system for displaying a personalized search result summary for a search result. The computer system includes one or more processors, one or more computer-readable memories and one or more computer-readable, tangible storage devices, and program instructions, stored on at least one of the one or more computer-readable, tangible storage devices for execution by at least one of the one or more processors via at least one of the one or more memories, to: receive a search result from executing a search query, determine a category of search for the search query, select a summary template from a collection of summary templates based on the category of search, and generate a personalized summary using the selected summary template and the received search result.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
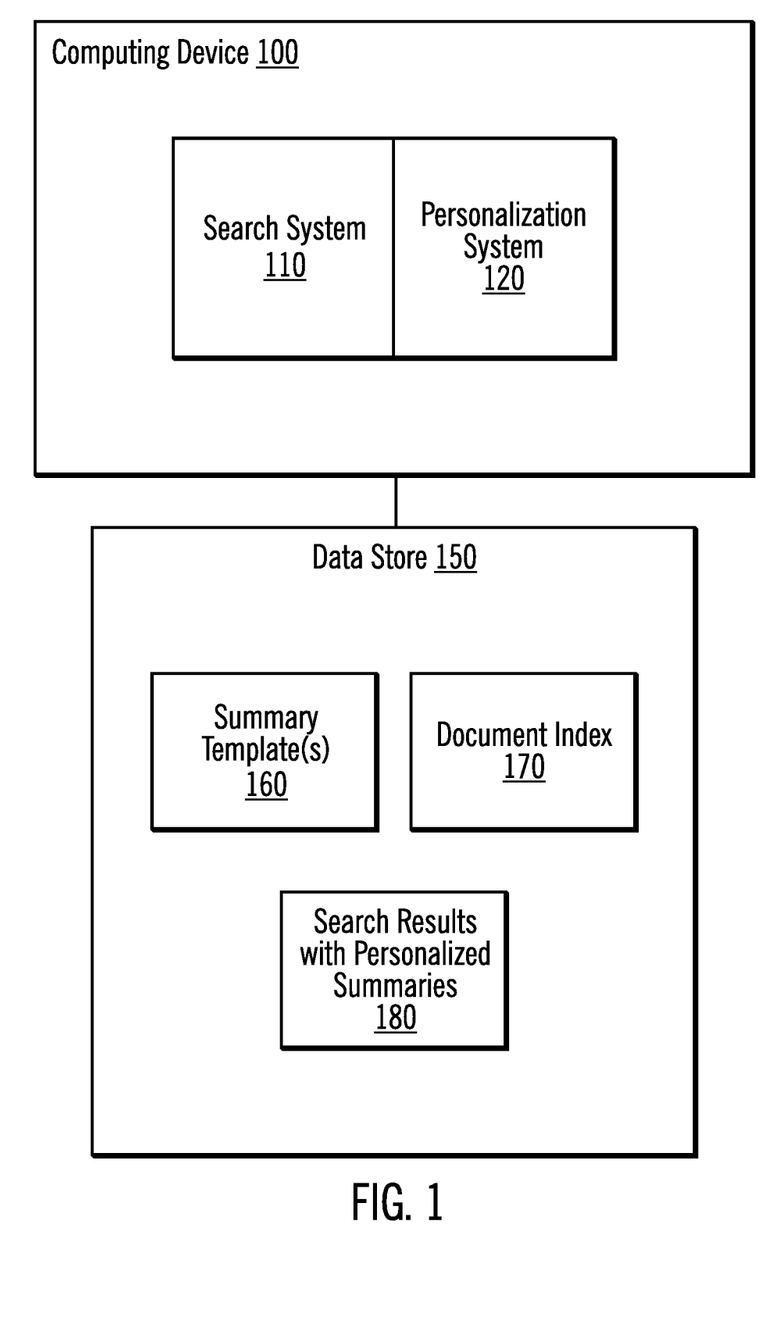
FIG. 1 illustrates, in a block diagram, a computing environment in accordance with certain embodiments.

FIG. 1 illustrates, in a block diagram, a computing environment in accordance with certain embodiments. A computing device 100 is coupled to a data store 150. The computing device 100 includes a search system 110 and a personalization system 120. In certain embodiments, the search system 110 is a search engine that provides a user interface into which a user may enter a search query including one or more keywords, and the search system 110 attempts to identify documents having the one or more keywords. Then, the personalization system 120 allows users to customize the summary provided with each of the identified documents in the search results. In certain embodiments, the search system 110 includes the personalization system 120. In alternative embodiments, the search system 110 and the personalization system 120 are separate systems that work together.

The personalization system 120 enables a user to have different categories of search result summaries for different categories of searches (e.g., person, book, travel location, patent, etc.). The personalization system 120 also enables a user obtain customized search result summary content. In this manner, the personalization system 120 enables users to read the search results at a glance.

The data store 150 may store one or more summary templates 160, an index of documents 170, and search results with personalized summaries.

The personalization system 120 enables users to create different categories of summary templates 160 for different categories of searches. For example, a doctor and a soccer player may have a same name, but, for a search for the doctor, a doctor summary template would be used to generate personalized summaries, and for a search for the soccer player, a soccer player summary template would be used to generate personalized summaries.

In certain embodiments, the personalization system 120 dynamically identifies the category of search (e.g., person, book, travel location, patent, etc.). Next, the personalization system 120 selects the appropriate summary template for that category of search. Then, the personalization system 120 displays the search result summary for a document according to the selected summary template. In certain embodiments, users may share the summary templates with other users. In certain embodiments, the summary templates are based on rules about the content of the search results.

Figure 2:
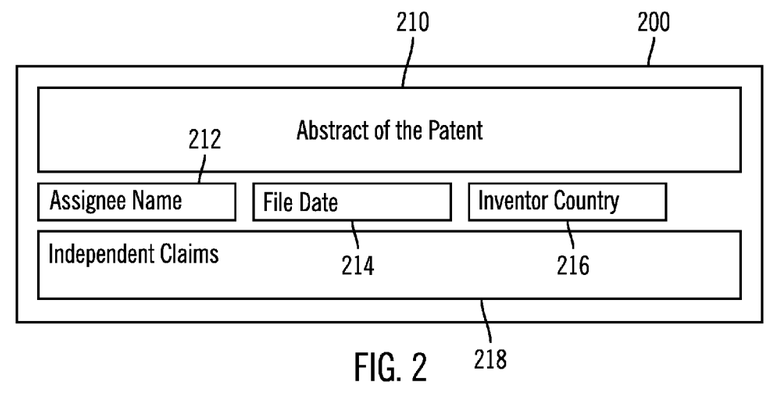
FIG. 2 illustrates an example patent summary template for a patent category of search in accordance with certain embodiments.

FIG. 2 illustrates an example patent summary template 200 for a patent category of search in accordance with certain embodiments. In certain embodiments, the personalization system 120 provides a summary template designer to enable the user to create one or more templates. In certain embodiments, a user may define a segment and provide a search query (e.g., with an AND condition, an OR condition or a combination of these conditions) for that segment. A segment may be described as any area of a document (e.g., title, author, etc.)

The patent summary template 200 may be stored with a user identifier (ID) (e.g., a user login ID) of the user who created the summary template 200. In addition, a user may indicate whether the summary template 200 may be shared with one or more other users (e.g., by providing a group identifier for a group of users, by providing one or more user IDS, by identifying a social network, etc.). Thus, a user using a social networking channel may create a summary template that is to be shared by other users. Then, when a user who may use the patent summary template 200 provides a search query, if the personalization system 120 identifies the search result as related to a patent, then the personalization system 120 selects the patent summary template 200 and displays the personalized summary for the search result using the patent summary template 200.

In FIG. 2, the user can define different segments 210, 212, 214, 216, 218. Then, in each segment, a user may provide a different search query to get the desired information for the personalized summary. In particular, while creating the summary template, for each segment, the user defines a search query, and, based on the conditions defined, the search query is executed to obtain results, and the summary template is populated with the results. For example, with reference to FIG. 2, a search query may be created based on the metadata properties: keyword, name of the paragraph of the document, name of document section tag, etc.

Figure 3:
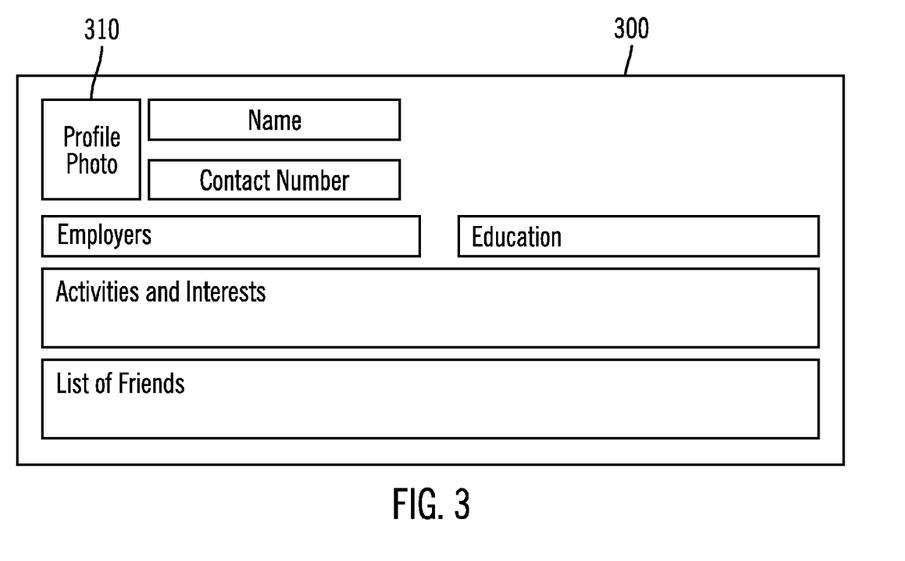
FIG. 3 illustrates an example person summary template for a person category of search in accordance with certain embodiments.

FIG. 3 illustrates an example person summary template 300 for a person category of search in accordance with certain embodiments. In the person summary template 300, for a profile photo segment 310, a search query may be included so that, when the search query is executed, a photo or video is displayed in this segment. In certain embodiments, a user may define any area and provide a search query. The search query may include the profile photo, name, contact number, employers, education, activities and interests, and list of friends.

Figure 4:
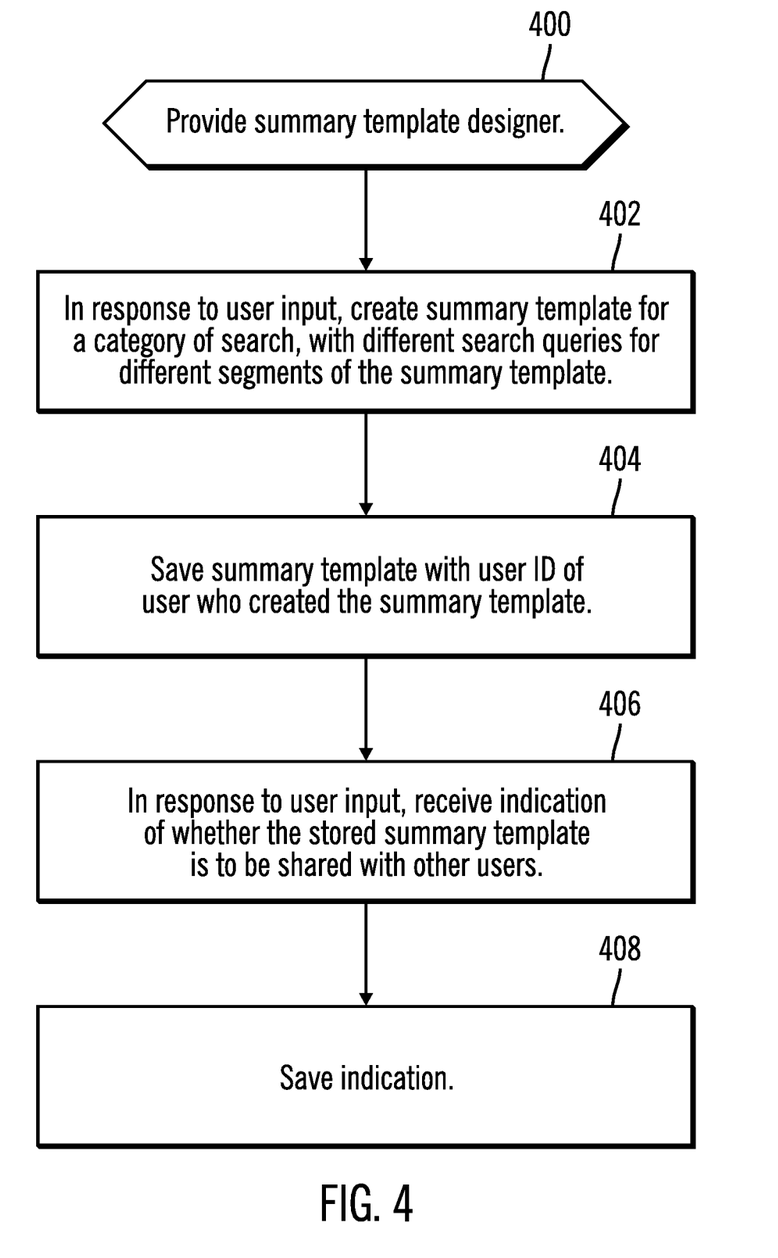
FIG. 4 illustrates, in a flow diagram, operations performed to create a summary template in accordance with certain embodiments.

FIG. 4 illustrates, in a flow diagram, operations performed to create a summary template in accordance with certain embodiments. Control begins at block 400 with the personalization system 120 providing summary template designer (e.g., a user interface through which a user may define the summary template). In block 402, the personalization system 120, in response to user input, creates the summary template for a category of search, with different search queries for different segments of the summary template. In block 404, the personalization system 120 saves the summary template with the user ID of the user who created the summary template. In block 406, the personalization system 120, in response to user input, receives an indication of whether the stored summary template is to be shared with other users. In block 408, the personalization system 120 saves the indication.

In certain embodiments, the personalization system 120 receives rules for the determination of which summary category to use. In certain embodiments, the rules are a set of "conditions→summary category" to use, and each condition may be a set of operations.

Following are some examples of rules.
    Content_Source(server names or repository types or file extensions)
    split Content_Source to Content_Type(file extension or mimetype)
    Content_Repository_Type(database, file system, content management system, etc.)
    Content_Server(various server patterns, like myrepository1.xyz.com)

In certain embodiments, Boolean operators may be used to connect simple conditions to build complex conditions (e.g., Content_Type(database) AND Content_Metadata(payroll), where the payroll summary template is used to display the search results (which utilize the payroll fields being returned as part of the search).

Figure 5A:
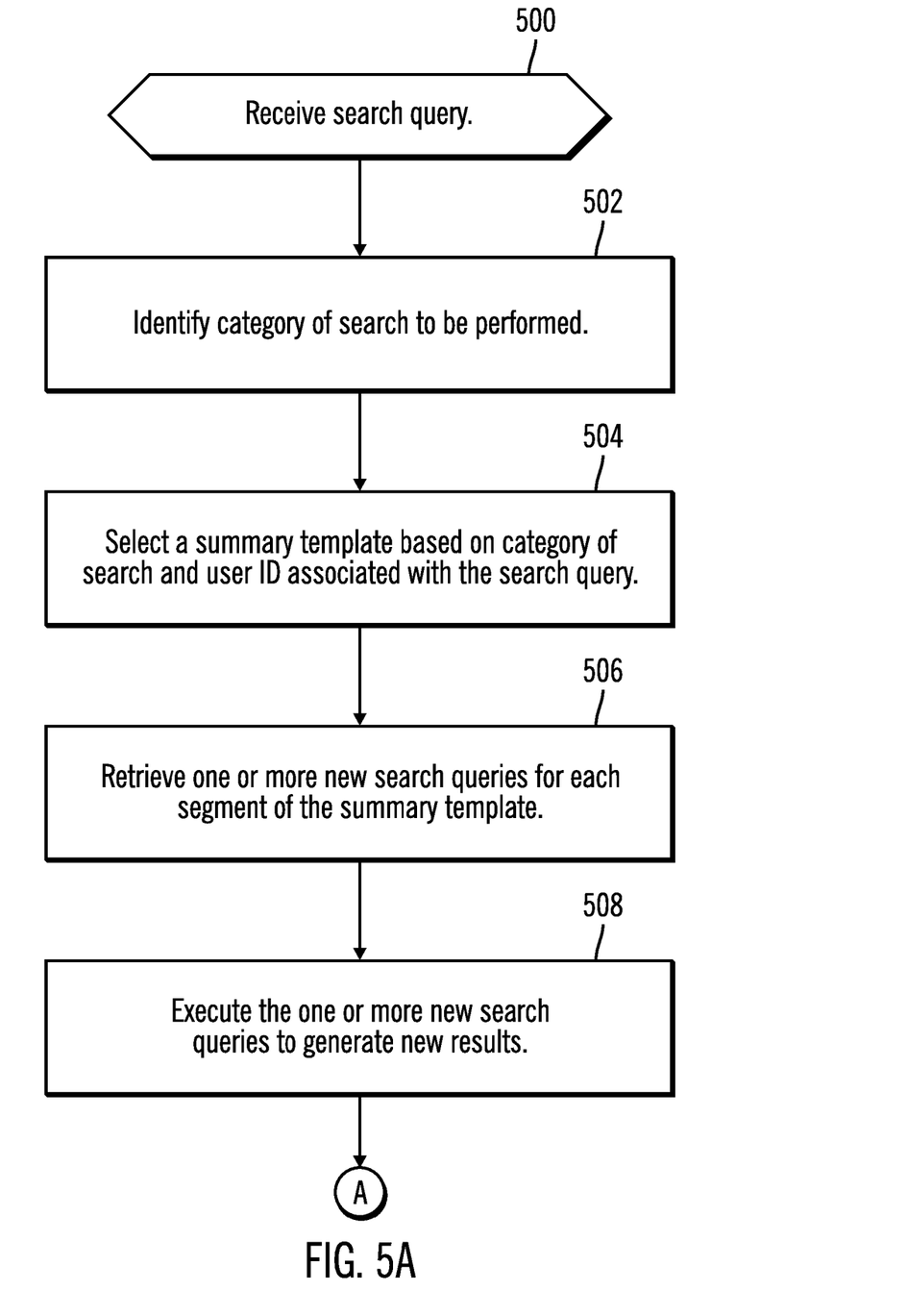
FIGS. 5A and 5B illustrate, in a flow diagram, operations performed to use a summary template in accordance with certain embodiments.
Figure 5B:
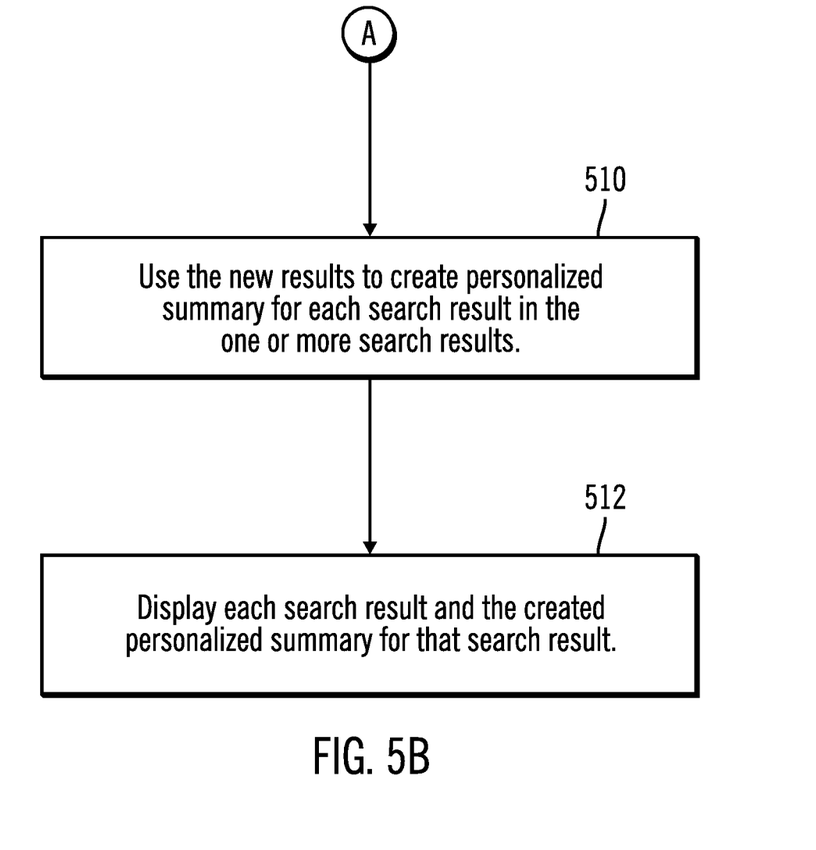

FIGS. 5A and 5B illustrate, in a flow diagram, operations performed to use a summary template in accordance with certain embodiments. Control begins at block 500 with the personalization system 120 receiving a search query (e.g., an Internet search query). The search query is associated with a user ID.

In block 502, the personalization system 120 identifies the category of search to be performed (e.g., using the rules and the search query). In certain embodiments, the personalization system 120 identifies the category based on text mining. Text mining may be described as parsing input text, deriving patterns from the parsed data, and generating analysis based on the patterns.

For example, if a user is searching for a particular name, where there exists one person with this name who is a soccer player and another person with this name who is a doctor, the content for the soccer player and the doctor would be different. In this example, the user may create one template for a sports person and another for professionals. So, for the soccer player, the personalization system 120 searches for records, scores, stadiums, etc. based on the sports person summary template, while for the doctor, the personalization system 120 searches for patients, hospitals, etc. using the professionals summary template. In certain embodiments, based on the search query provided by the user, the personalization system 120 performs ontology based text mining and dynamically identifies the category of search. In certain embodiments, based on the rule defined in the summary template, the personalization system 120 checks each search result and identifies the appropriate summary template. That is, the content of search result are compared against the defined rules.

In block 504, the personalization system 120 selects a summary template based on the category of search and the user ID associated with the search query. In certain embodiments, the personalization system 120 may select the summary template based on the category of search or the user ID associated with the search query. In certain embodiments, the personalization system 120 selects the summary template if the user ID associated with the search query is the user ID of the user who created the summary template or is the user ID of another user who is authorized to use the summary template.

In block 506, the personalization system 120 retrieves one or more new search queries for each segment of the summary template. In block 508, the personalization system 120 executes the one or more new search queries to generate new results. From block 508 (FIG. 5A), processing continues to block 510 (FIG. 5B).

In block 510, the personalization system 120 uses the new results to create a personalized summary for each search result in the one or more search results by filling in a segment of the summary template. In block 512, the personalization system 120 displays each search result and the created personalized summary for that search result.

Also, the same search result may be shown with different personalized results based on different summary templates being selected.

With such personalized summaries, the user may better understand the search result (e.g., document) without opening the search result.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 6:
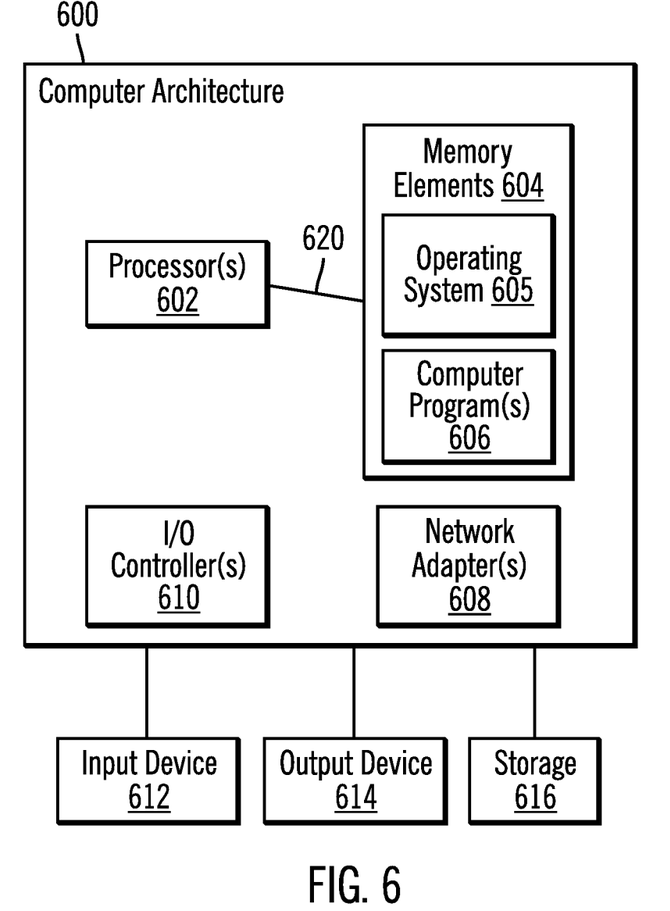
FIG. 6 illustrates, in a block diagram, a computer architecture that may be used in accordance with certain embodiments.

FIG. 6 illustrates a computer architecture 600 that may be used in accordance with certain embodiments. In certain embodiments, computing device 100 may implement computer architecture 600. The computer architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The computer architecture 600 may be coupled to storage 616 (e.g., any type of storage device; a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The computer architecture 600 may include fewer components than illustrated, additional components not illustrated herein, or some combination of the components illustrated and additional components. The computer architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A method, comprising:
   storing, with a processor of a computer, a collection of summary templates, wherein each summary template of the collection of summary templates includes a plurality of segments, wherein each of the plurality of segments has a segment search query that is based on metadata properties;
   executing, with the processor of the computer, a search query associated with a first user identifier to obtain initial search results with an initial summary for each of the initial search results;
   determining, with the processor of the computer, a category of search for the search query;
   selecting, with the processor of the computer, a summary template associated with a second user identifier from the collection of summary templates based on the category of search and based on the first user identifier and the second user identifier matching;
   for each search result of the initial search results, generating a new summary for each search result by:
   executing, with the processor of the computer, the segment search query for each of the plurality of segments in the summary template to obtain new results for each of the plurality of segments; and
   populating, with the processor of the computer, each of the plurality of segments of the summary template with the new results of the segment search query; and
   displaying, with the processor of the computer, the initial search results by replacing the initial summary with the new summary for each of the initial search results.

2. The method of claim 1, further comprising:
   receiving a new summary template; and
   adding the new summary template to the collection of summary templates associated with a user identifier of a user who created the new summary template.

3. The method of claim 1, further comprising:
   comparing the initial search results with one or more rules that each specify a content type and content metadata to determine the category of search.

4. The method of claim 1, further comprising:
   selecting a second summary template from the collection of summary templates; and
   generating another new summary according to the second summary template for each of the initial search results.

5. The method of claim 1, wherein the collection of summary templates includes at least one summary template from a social networking channel.

* * * * *